US011694299B2

(12) United States Patent
Levit-Gurevich et al.

(10) Patent No.: US 11,694,299 B2
(45) Date of Patent: *Jul. 4, 2023

(54) METHODS AND APPARATUS TO EMULATE GRAPHICS PROCESSING UNIT INSTRUCTIONS

(71) Applicant: Intel Corporation, Santa Clara, CA (US)

(72) Inventors: Konstantin Levit-Gurevich, Kiryat Byalik (IL); Michael Berezalsky, Tirat Carmel (IL); Noam Itzhaki, Yokneam Elit Ha (IL); Arik Narkis, Kiryat Tivon (IL); Orr Goldman, Kibbutz Harel (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/484,942

(22) Filed: Sep. 24, 2021

(65) Prior Publication Data

US 2022/0012844 A1 Jan. 13, 2022

Related U.S. Application Data

(63) Continuation of application No. 16/783,878, filed on Feb. 6, 2020, now Pat. No. 11,132,761, which is a
(Continued)

(51) Int. Cl.
*G06T 1/20* (2006.01)
*G06F 9/455* (2018.01)
(Continued)

(52) U.S. Cl.
CPC .............. *G06T 1/20* (2013.01); *G06F 9/3877* (2013.01); *G06F 9/455* (2013.01); *G06F 9/5055* (2013.01); *G06T 1/60* (2013.01)

(58) Field of Classification Search
None
See application file for complete search history.

(56) References Cited

U.S. PATENT DOCUMENTS 10,559,057 B2  2/2020  Levit-Gurevich et al.
11,132,761 B2  9/2021  Levit-Gurevich et al.
(Continued)

OTHER PUBLICATIONS

United States Patent and Trademark Office, "Notice of Allowance," issued in connection with U.S. Appl. No. 16/144,290, dated Sep. 25, 2019, 7 pages.
(Continued)

*Primary Examiner* — Frank S Chen
(74) *Attorney, Agent, or Firm* — Hanley, Flight & Zimmerman, LLC

(57) ABSTRACT

Embodiments are disclosed for emulation of graphics processing unit instructions. An example method executing an instrumented kernel using a logic circuit, the instrumented kernel including an emulation sequence; saving, in response to determination that the emulation sequence is to be executed, source data to a shared memory; setting an emulation request flag to indicate to processor circuitry separate from the logic circuit that offloaded execution of the emulation sequence is to be executed; monitoring the emulation request flag to determine whether the offloaded execution of the emulation sequence is complete; and accessing resulting data from the shared memory.

23 Claims, 10 Drawing Sheets

Related U.S. Application Data continuation of application No. 16/144,290, filed on Sep. 27, 2018, now Pat. No. 10,559,057.

(51) Int. Cl.
  *G06T 1/60* (2006.01)
  *G06F 9/38* (2018.01)
  *G06F 9/50* (2006.01)

(56) References Cited

U.S. PATENT DOCUMENTS

| | | | |
|---|---|---|---|
| 2001/0029205 | A1 | 10/2001 | Taho et al. |
| 2010/0095072 | A1* | 4/2010 | Ido .................. G06F 12/0815 711/E12.066 |
| 2011/0035736 | A1 | 2/2011 | Stefansson et al. |
| 2012/0222033 | A1* | 8/2012 | Byrum ................ G06F 9/5044 718/102 |
| 2014/0006757 | A1* | 1/2014 | Assarpour ............ G06F 9/3838 712/226 |
| 2014/0052965 | A1* | 2/2014 | Sarel .................... G06F 9/4893 712/214 |
| 2014/0059336 | A1* | 2/2014 | Rugina ............... G06F 11/3003 713/2 |
| 2014/0375658 | A1 | 12/2014 | Lichmanov et al. |
| 2015/0268963 | A1 | 9/2015 | Etsion et al. |
| 2018/0373514 | A1 | 12/2018 | Gordon et al. |

OTHER PUBLICATIONS

United States Patent and Trademark Office, "Non-Final Office Action," issued in connection with U.S. Appl. No. 16/783,878, dated Feb. 1, 2021, 8 pages.

United States Patent and Trademark Office, "Notice of Allowance," issued in connection with U.S. Appl. No. 16/783,878, dated May 26, 2021, 5 pages.

* cited by examiner

METHODS AND APPARATUS TO EMULATE GRAPHICS PROCESSING UNIT INSTRUCTIONS

RELATED APPLICATIONS

This patent arises from a continuation of U.S. patent application Ser. No. 16/783,878, entitled "METHODS AND APPARATUS TO EMULATE GRAPHICS PROCESSING UNIT INSTRUCTIONS," which was filed on Feb. 6, 2020, which was a continuation of U.S. patent application Ser. No. 16/144,290, entitled "METHODS AND APPARATUS TO EMULATE GRAPHICS PROCESSING UNIT INSTRUCTIONS," which was filed on Sep. 27, 2018. U.S. patent application Ser. No. 16/144,290 is hereby incorporated by reference in its entirety.

FIELD OF THE DISCLOSURE

This disclosure relates generally to graphics processing units (GPUs), and, more particularly, to methods and apparatus to emulate GPU instructions.

BACKGROUND

Graphics processing units (GPUs) are used to execute instruction packages. New designs of GPUs and/or instruction sets supported by those GPUs are continually being designed. Such development of next-generation hardware is usually an iterative process of hardware/software co-design. In some cases, there may be a desire to execute instructions that are not yet supported by a GPU.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

A graphics processing unit (GPU) is an electronic circuit that executes instructions to modify contents of a buffer. Typically, the buffer is a frame buffer that is used to output information to a display device (e.g., a monitor). Recently, GPUs have been used for tasks that are not necessarily related to generating output images.

GPUs execute instruction packages commonly referred to as kernels, compute kernels, and/or shaders. Typically, the term shader is used when a kernel is used for graphics-related tasks such as, for example, DirectX, Open Graphics Library (OpenGL) tasks, pixel shader/shading tasks, vertex shader/shading tasks, etc. The term kernel is used for general purpose computational tasks such as, for example, Open Computing Language (OpenCL) tasks, C for Media tasks, etc. While example approaches disclosed herein use the term kernel, such approaches are equally well suited to be used on shaders. Such kernels roughly correspond to an inner loop of a program that is iterated multiple times. As used herein, a GPU kernel refers to a kernel in binary format. A GPU programmer develops kernels/shaders in a high-level programming language such as, for example, a High-Level Shader Language (HLSL), OpenCL, etc., and then compiles the code into a binary version of the kernel which is then executed by a GPU. Example approaches disclosed herein are applied to the binary version of the kernel.

Development of next-generation graphics processing unit (GPU) hardware is usually an iterative process of hardware/software co-design, where software development (e.g., for evaluation of new features, detection of bottlenecks, performance evaluation, etc.) may begin prior to actual hardware existing.

Existing instruction simulation approaches are very slow and do not enable efficient evaluation of real-world applications. For example, GPU simulation approaches currently take approximately twenty-four hours to simulate one minute of GPU execution. In addition, during the new hardware design a specific instruction or feature is being frequently changed, and thus its frequent re-implementation within simulator is very inefficient.

Example approaches disclosed herein utilize emulation of new GPU instructions and/or features provided by new GPU hardware, on existing GPU hardware platforms. Such an approach enables execution of real-world applications which include new instructions at a performance close to real hardware.

Figure 1:
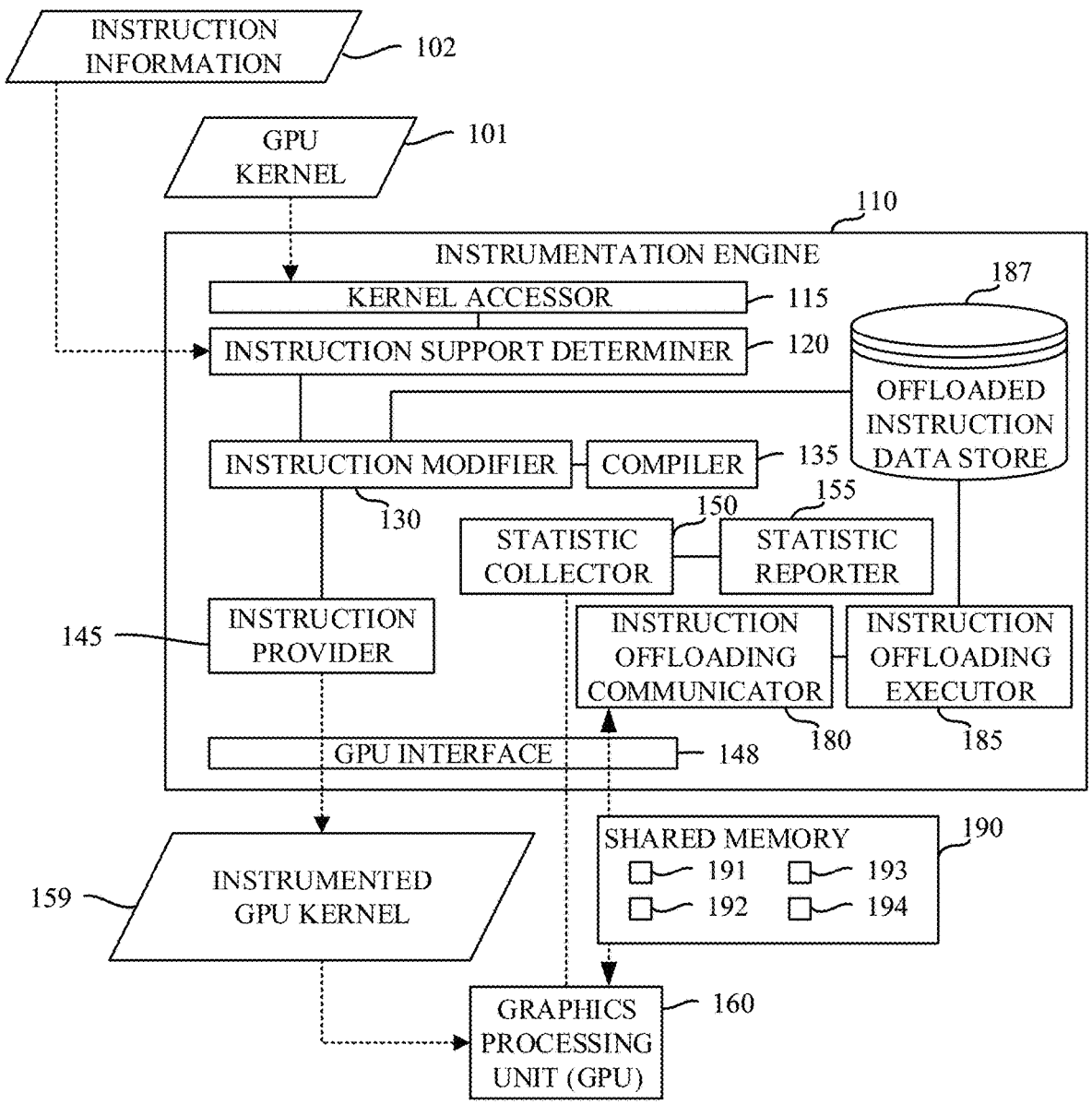
FIG. 1 is a block diagram of an example instrumentation engine instrumented in accordance with teachings of this disclosure to emulate graphics processing unit instructions.

FIG. 1 is a block diagram of an example instrumentation engine 110 instrumented in accordance with teachings of this disclosure to emulate graphics processing unit instructions. The example instrumentation engine receives a GPU kernel 101 (e.g., in a binary format) and modifies the GPU kernel to create an instrumented GPU kernel 159. In some examples, rather than accessing an already-compiled GPU kernel (e.g., GPU kernel 101), the example instrumentation engine 110 may compile an un-compiled GPU kernel to create the instrumented GPU kernel 159. The instrumented GPU kernel 159 is passed to a graphics processing unit (GPU) 160. In the illustrated example of FIG. 1, the instrumentation engine 110 includes a kernel accessor 115, an instruction support determiner 120, an instruction modifier 130, a compiler 135, an instruction provider 145, a GPU interface 148, a statistic collector 150, a statistic reporter 155, an instruction offloading communicator 180, and an instruction offloading executor 185. In the illustrated example of FIG. 1, the example instrumentation engine 110 communicates with the GPU 160 using a shared memory 190.

The example kernel accessor 115 of the illustrated example of FIG. 1 is implemented using a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The example kernel accessor 115 accesses an incoming GPU kernel (e.g., the GPU kernel 101 of FIG. 1). In some examples, the GPU kernel 101 is accessed from a memory by the kernel accessor 115. In some examples, the GPU kernel 101 is provided by a software developer. In some examples, instead of providing the GPU kernel 101 directly, a reference to (e.g., a pointer, a filename, a uniform resource locator (URL), etc.) the GPU kernel 101 is provided, such that the example kernel accessor 115 retrieves the GPU kernel 101 for instrumentation.

The example instruction support determiner 120 of the illustrated example of FIG. 1 is implemented using a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example instruction support determiner 120 determines whether the instruction identified by the kernel accessor 115 is supported by the GPU 160. In examples disclosed herein, the example instruction support determiner 120 determines whether the instruction is supported by the GPU 160 by consulting the instruction information 102. However, any other approach to determining whether the GPU will support a given instruction may additionally or alternatively be used.

The example instruction modifier 130 of the illustrated example of FIG. 1 is implemented using a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example instruction modifier 130 modifies instructions of a GPU kernel (e.g., the GPU kernel 101) to create the instrumented GPU kernel 159. In examples disclosed herein, the instruction modifier 130 modifies the GPU kernel 101 using at least one of an inline emulation approach, an appended emulation approach, or an offloaded emulation approach.

The example compiler 135 of the illustrated example of FIG. 1 is implemented using a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example compiler 135 compiles high-level instructions (e.g., human-usable source code) into low-level instructions (e.g., assembly language instructions, machine language instructions, etc.) that can be executed by the GPU 160. In some examples, the compiler 135 compiles the high-level instructions into CPU-executable instructions so that the functionality implemented by those high-level instructions may be executed by the example instruction offloading executor 185 as part of the offloaded emulation approach.

The example instruction provider 145 of the illustrated example of FIG. 1 is implemented using a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example instruction provider 145 provides the instrumented kernel to the GPU 160 for execution via the example GPU interface 148. In some examples, the instruction provider 145 instructs the GPU 160 to execute the instrumented kernel.

The example GPU interface 148 of the illustrated example of FIG. 1 is implemented using a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example GPU interface 148 enables communication between the instrumentation engine 110 and the example GPU 160 and/or the example shared memory 190. In examples disclosed herein, the example GPU interface 148 implements a driver that enables the communications with the GPU 160. However, any other approach to facilitating communication with a GPU may additionally or alternatively be used.

The example statistic collector 150 of the illustrated example of FIG. 1 is implemented using a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example statistic collector 150 collects results of the execution of the instrumented kernel by interfacing with the GPU 160 via the GPU interface 148.

The example statistic reporter 155 of the illustrated example of FIG. 1 is implemented using a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example statistic reporter 155 prepares a report of the statistics of the execution of the instrumented GPU kernel (e.g., based on the statistics collected by the example statistic collector 150). Such reports are useful to enable a better understanding of performance metrics of the next generation GPU hardware.

The example GPU 160 of the illustrated example of FIG. 1 is implemented using a circuit. The GPU 160 executes instructions to modify the contents of a buffer (e.g., a buffer stored in a memory internal to the GPU 160 and/or a memory external to the GPU 160, such as the shared memory 190). Typically, the buffer is a frame buffer that is used to output information to a display device (e.g., a monitor). Recently, GPUs have been used for tasks that are not necessarily related to generating output images such as, for example, computationally intensive tasks. In examples disclosed herein, the GPU 160 executes an instruction package commonly referred to as a kernel and/or a compute kernel. In the illustrated example of FIG. 1 a single GPU is shown. However, some computing systems may utilize multiple GPUs.

The example instruction offloading communicator 180 is implemented using a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example instruction offloading communicator 180 polls the emulation request flag 191 of the shared memory 190 to detect whether the GPU 160 has requested emulation offloading. In examples disclosed herein, a single shared memory 190 and/or emulation request flag 191 is used. However, in practice, multiple emulation request flags corresponding to each hardware thread executed by the GPU 160 may be monitored.

In response to identifying a request for offloaded emulation, the example instruction offloading communicator 180 identifies the emulation instructions to be executed. In examples disclosed herein, the example instruction offloading communicator 180 detects an emulation sequence identifier within the emulation request (e.g., stored at the request data address 192 of the shared memory 190), and performs a lookup in the offloaded instruction data store 187 to retrieve the instructions for execution. However, any other approach to identifying the instructions may additionally or alternatively be used. For example, separate shared memory locations may be used for different emulation sequences, the emulation sequence (e.g., the source code or a compiled version thereof) may be provided as part of the offloading request, etc.

The example instruction offloading communicator 180 accesses source data from the source data address 193 of the shared memory 190, and provides the source data to the instruction offloading executor 185 for execution. The example instruction offloading communicator 180 receives resulting data from the instruction offloading executor 185, and writes the resulting data to the resulting data address 194 of the shared memory 190. The example instruction offloading communicator 180 then indicates to the GPU 160 that the execution of the offloaded instructions is complete. In examples disclosed herein, the indication that the execution of the offloaded instructions is complete is provided by setting an execution completion flag in the shared memory 190. However, in some examples, the indication may be provided by clearing the emulation request flag 191, which was previously set by the GPU 160 (e.g., to indicate the presence of the offloading request).

The example instruction offloading executor 185 is implemented using a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example instruction offloading executor 185 executes instructions identified by the emulation offloading communicator 180 using source data retrieved from the shared memory 190 by the emulation offloading communicator 180. The example emulation offloading executor 185 provides the resulting data to the example instruction offloading communicator 180, to enable the instruction offloading communicator 180 to write the resulting data to the resulting data address 194 of the shared memory 190.

The example offloaded instruction data store 187 of the illustrated example of FIG. 1 is implemented by any memory, storage device and/or storage disc for storing data such as, for example, flash memory, magnetic media, optical media, etc. Furthermore, the data stored in the private model data store 310 may be in any data format such as, for example, binary data, comma delimited data, tab delimited data, structured query language (SQL) structures, etc. While in the illustrated example the offloaded instruction data store 187 is illustrated as a single device, the example offloaded instruction data store 187 and/or any other data storage device described herein may be implemented by any number and/or type(s) of memories. In the illustrated example of FIG. 1, the offloaded instruction data store 187 stores executable instructions that may be executed by the example instruction offloading executor 185 to implement offloaded execution of an instruction that is otherwise unsupported by the GPU 160.

The example shared memory 190 is implemented by is implemented by any memory, storage device and/or storage disc for storing data such as, for example, flash memory, magnetic media, optical media, etc. Furthermore, the data stored in the shared memory 190 may be in any data format such as, for example, binary data, comma delimited data, tab delimited data, structured query language (SQL) structures, etc. While in the illustrated example the shared memory 190 is illustrated as a single device, the example shared memory 190 and/or any other data storage device described herein may be implemented by any number and/or type(s) of memories. The example shared memory 190 includes memory addresses and/or locations to enable sharing of information between the GPU 160 and the instrumentation engine 110. In examples disclosed herein, the memory addresses include an emulation request flag 191, a request data address 192, a source data address 193, and a resulting data address 194.

In examples disclosed herein, a single shared memory 190 is shown. However, in practice, multiple shared memories may be used corresponding to each hardware thread executed by the GPU 160.

The example emulation request flag 191 indicates whether an emulation request has been created by the GPU 160. The information in the example emulation request flag 191 is periodically queried by the instrumentation engine 110 to determine whether the GPU has requested emulation offloading. In some examples, the instrumentation engine 110 clears the emulation request flag 191 to indicate to the GPU 160 that emulation offloading is complete. However, any other approach to indicating to the GPU 160 that emulation offloading is complete may additionally or alternatively be used.

The example request data address 192 stores information identifying the GPU instructions that are to have their execution offloaded. In examples disclosed herein, the memory at the request data address 192 is written to by the GPU 160, and is read by the instrumentation engine 110.

The example source data address 193 stores information to be used as an input to the execution of the emulation offloading (e.g., input data). In examples disclosed herein, the memory at the source data address 193 is written to by the GPU 160, and is read by the instrumentation engine 110.

The example resulting data address 194 stores information resulting from the execution of the emulation offloading (e.g., output data). In examples disclosed herein, the memory at the resulting data address is written to by the instrumentation engine 110, and is read by the GPU 160.

While an example manner of implementing the example instrumentation engine 110 is illustrated in FIG. 1, one or more of the elements, processes and/or devices illustrated in FIG. 1 may be combined, divided, re-arranged, omitted, eliminated and/or implemented in any other way. Further, the example kernel accessor 115, the example instruction support determiner 120, the example instruction modifier 130, the example compiler 135, the example instruction provider 145, the example GPU interface 148, the example statistic collector 150, the example statistic reporter 155, the example instruction offloading communicator 180, the example instruction offloading executor 185, the example offloaded instruction data store 187, and/or, more generally, the example instrumentation engine 110 of FIG. 1 may be implemented by hardware, software, firmware and/or any combination of hardware, software and/or firmware. Thus, for example, any of the example kernel accessor 115, the example instruction support determiner 120, the example instruction modifier 130, the example compiler 135, the example instruction provider 145, the example GPU interface 148, the example statistic collector 150, the example statistic reporter 155, the example instruction offloading communicator 180, the example instruction offloading executor 185, the example offloaded instruction data store 187, and/or, more generally, the example instrumentation engine 110 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example kernel accessor 115, the example instruction support determiner 120, the example instruction modifier 130, the example compiler 135, the example instruction provider 145, the example GPU interface 148, the example statistic collector 150, the example statistic reporter 155, the example instruction offloading communicator 180, the example instruction offloading executor 185, the example offloaded instruction data store 187, and/or, more generally, the example instrumentation engine 110 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example instrumentation engine 110 of FIG. 1 may include one or more elements, processes and/or devices in addition to, or instead of, those illustrated in FIG. 1, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 2:
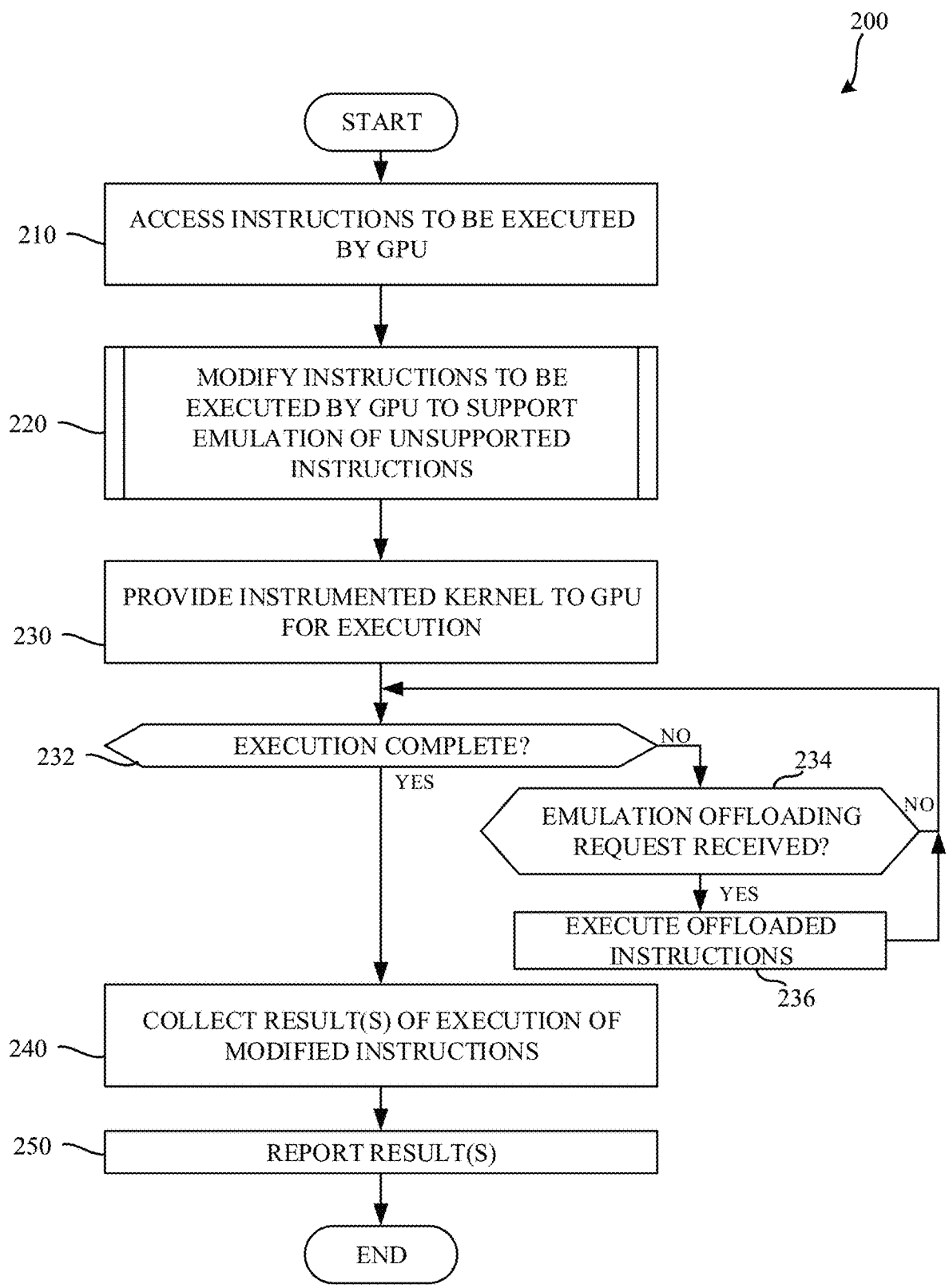
FIG. 2 is a flowchart representative of machine readable instructions that, when executed, cause the example instrumentation engine to instrument a GPU kernel with modified instructions for emulation.
Figure 3:
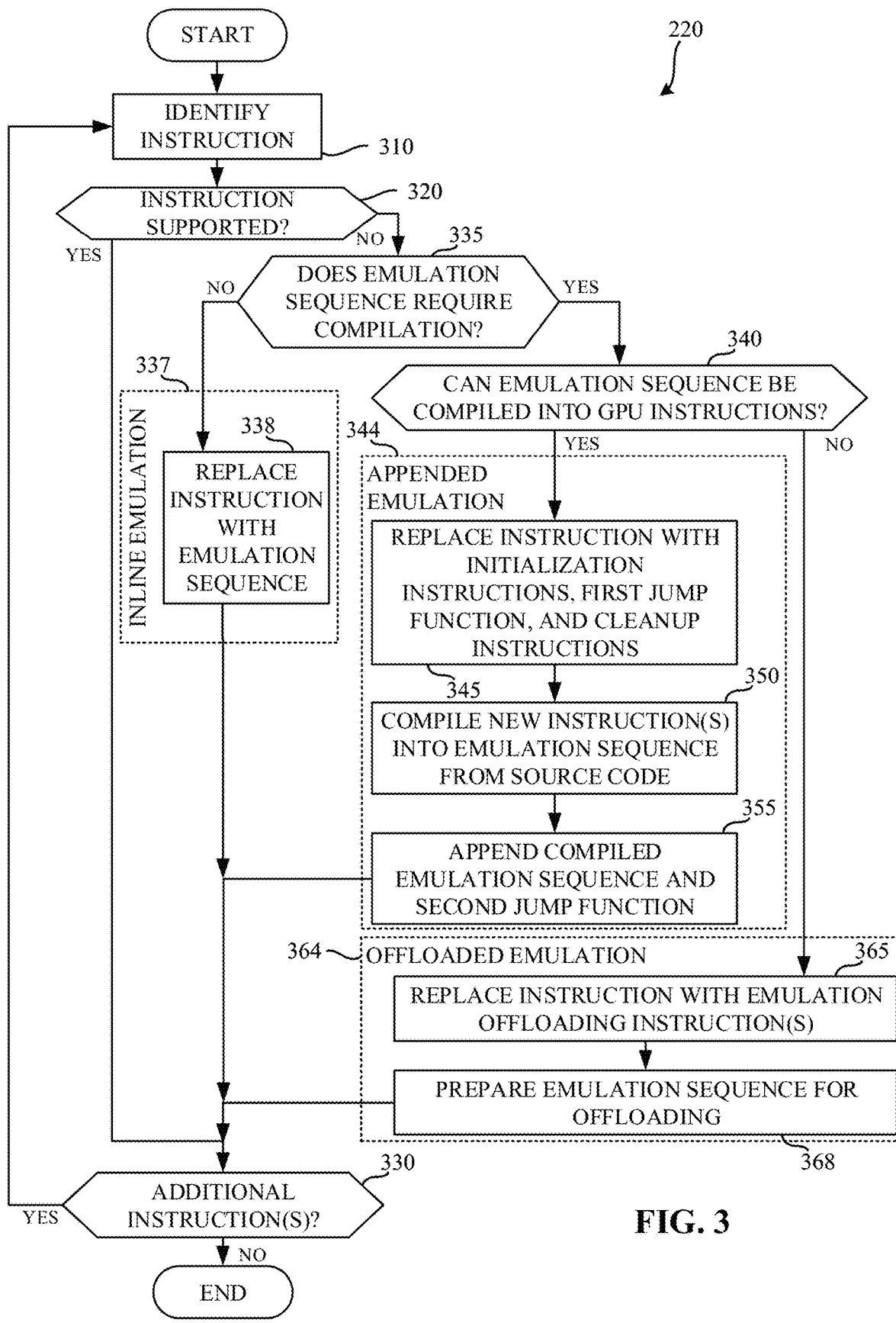
FIG. 3 is a flowchart representative of machine readable instructions that, when executed, cause the example instrumentation engine to modify GPU instructions for emulation.
Figure 7:
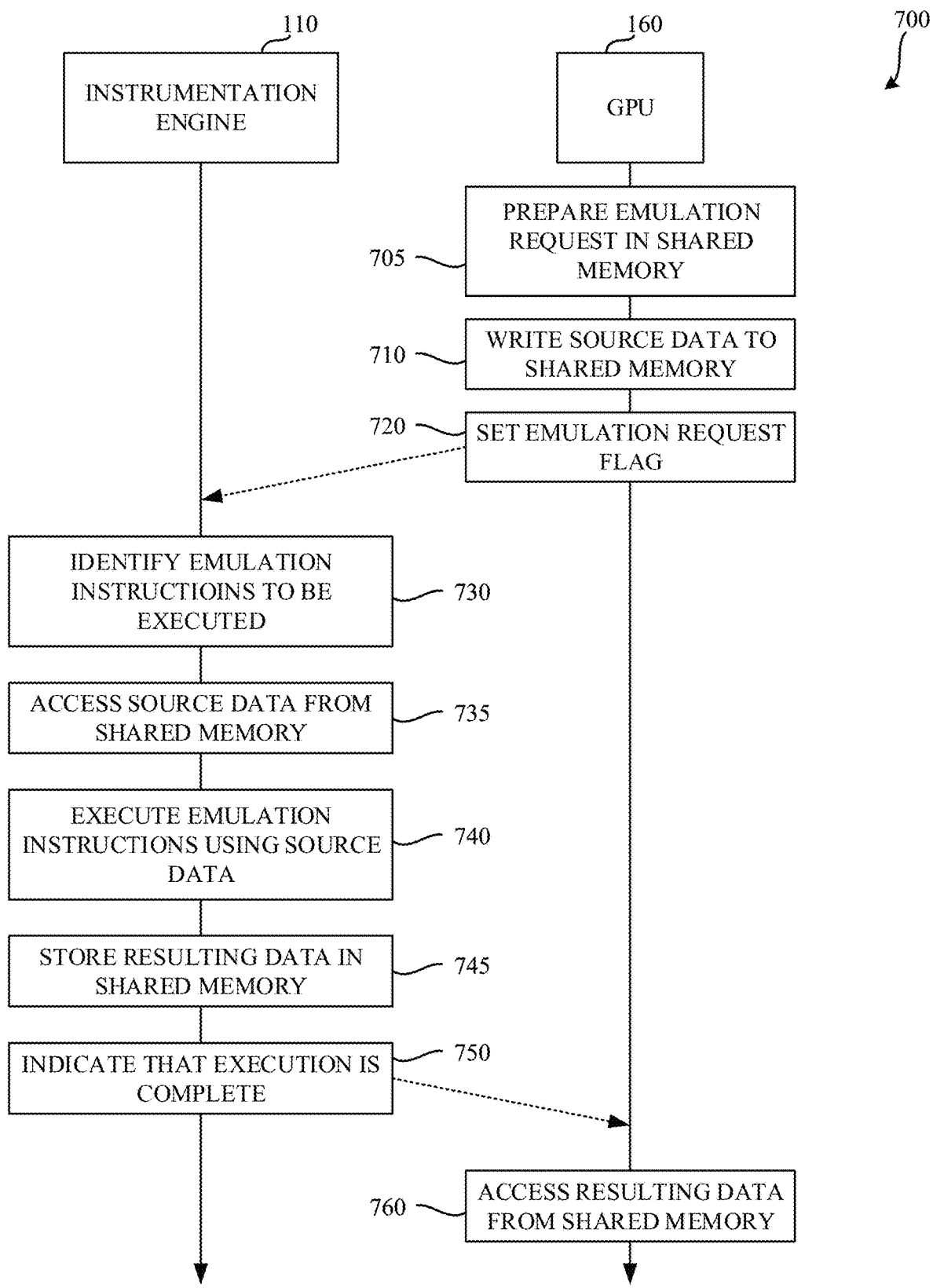
FIG. 7 is a communications diagram representing operations to be performed by the instrumentation engine and GPU of FIG. 1.

Flowcharts representative of example hardware logic, machine readable instructions, hardware implemented state machines, and/or any combination thereof for implementing the instrumentation engine 110 of FIG. 1 are shown in FIGS. 2, 3, 7, and/or 9. Flowcharts representative of example hardware logic, machine readable instructions, hardware implemented state machines, and/or any combination thereof for implementing the example GPU 160 of FIG. 1 are shown in FIGS. 7 and/or 8. The machine readable instructions may be an executable program or portion of an executable program for execution by a computer processor such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 2, 3, 7, 8, and/or 9, many other methods of implementing the example instrumentation engine 110 and/or the example GPU 160 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 2, 3, 7, 8, and/or 9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 2 is a flowchart representative of machine readable instructions that, when executed, cause the example instrumentation engine to instrument a GPU kernel with modified instructions for emulation.

The example process 200 of the illustrated example of FIG. 2 begins when the example kernel accessor 115 accesses instructions to be executed by the GPU 160. (Block 210). In examples disclosed herein, a kernel includes instructions, some of which may not yet be supported by the GPU 160. The example instrumentation engine 110 modifies the instructions of the kernel 101 to produce an instrumented kernel 159 for execution by the GPU 160. (Block 220). An example approach for implementing the instructions of block 220 is shown below in connection with FIG. 3.

The instrumented kernel (e.g., the instrumented GPU kernel 159 of FIG. 1) is provided by the example instruction provider 145 to the GPU 160 for execution (e.g., via the GPU interface 148). (Block 230). The example instruction provider 145 monitors the GPU 160 via the GPU interface 148 to determine if execution of the instrumented GPU kernel 159 is complete. (Block 232). If the execution of the GPU kernel 159 is not complete, the example instruction offloading communicator 180 monitors the shared memory 190 for a request to offload execution from the GPU. (Block 234). If no offloading request is received (e.g., block 234 returns a result of NO), control proceeds to block 232 where the example process of blocks 232 and 234 is repeated until either an emulation offloading request is received (e.g., block 234 returns a result of YES), or execution of the instrumented GPU kernel 159 is completed (e.g., block 232 returns a result of YES). When a request for offloading is identified (e.g., when block 234 returns a result of YES), the example instruction offloading executor 185 identifies and executes the emulation sequence requested by the GPU 160. (Block 236). Control then returns to block 232. An example approach for monitoring for and performing instruction execution offloading is described below in connection with FIGS. 7, 8, and/or 9.

When the example instruction provider 145 determines that the execution of the instrumented kernel 159 is complete (e.g., block 232 returns a result of YES), the example statistic collector 150 collects results of the execution of the instrumented kernel by interfacing with the GPU 160 via the GPU interface 148. (Block 240). The example statistic reporter 155 prepares a report of the statistics of the execution of the instrumented GPU kernel. (Block 250). The example process 200 of the illustrated example of FIG. 2 then terminates.

FIG. 3 is a flowchart representative of machine readable instructions 220 that, when executed, cause the example instrumentation engine 110 to modify GPU instructions for emulation. The example process 220 of the illustrated example of FIG. 3 begins when the example kernel accessor 115 identifies an instruction in the GPU kernel 101. (Block 310). The example instruction support determiner 120 determines whether the instruction identified by the kernel accessor 115 is supported by the GPU 160. (Block 320). In examples disclosed herein, the example instruction support determiner 120 determines whether the instruction is supported by the GPU 160 by consulting the instruction information 102. If the example instruction support determiner 120 determines that the identified instruction is supported (e.g., block 320 returns a result of YES), the example kernel accessor 115 determines whether any additional instructions exist in the GPU kernel 210 for review. (Block 330). If additional instructions exist for review (e.g., block 330 returns a result of YES), execution of the example process 220 of FIG. 3 continues until no additional instructions exist for review (e.g., until block 330 returns a result of NO).

Returning to block 320, if the example instruction support determiner 120 determines that the instruction identified by the kernel accessor 115 is not supported (e.g., block 320 returns a result of NO), steps are taken to modify the GPU kernel 101 to create the instrumented GPU kernel 159 such that the unsupported instructions may be either replaced with an in-line emulation sequence (an inline emulation approach 337), replaced with instructions that cause an appended emulation sequence to be used (an appended emulation approach 344), or replaced with instructions that cause offloading of the emulation sequence to be performed (an offloaded emulation approach 364).

The example instruction support determiner 120 reviews the emulation sequence provided in association with the unsupported instruction in the instruction information 102 to determine whether the emulation sequence requires compilation. (Block 335). If, for example, the emulation sequence were provided using a low-level language (e.g., assembly language, machine language, etc.), no compilation would be needed, and the unsupported instruction is replaced by the emulation sequence in-line. Thus, if the example instruction support determiner 120 determines that the emulation sequence does not require compilation (e.g., block 335 returns a result of NO), the example instruction modifier 130 modifies the instructions using the in-line emulation approach 337. That is, the example instruction modifier 130 replaces the instruction with the emulation sequence in-line. (Block 338). Diagrams illustrating the example in-line emulation approach 337, where an instruction is replaced with an emulation sequence, are described in detail below in connection with FIGS. 4 and/or 5. Control then proceeds to block 330 where the example kernel accessor 115 determines whether any additional instructions exist for review.

In examples disclosed herein, in-line emulation sequences are preferred, as the instrumented GPU kernel created by the in-line emulation approach 337, when executed by the GPU 160, does not involve additional overhead for transferring instruction control (e.g., jumping) to a different instruction location and/or offloading the instructions to the instrumentation engine 110. However, using the in-line emulation approach 337 involves code development on the part of a developer (e.g., to create the emulation sequence in a low-level language as part of preparation of the instruction information 102). As many developers tend to write in a high-level language (e.g., C), for those developers, it is much easier to write a small emulation function in C and provide the high-level language version of the function as part of the instruction information 102, instead of developing the emulation sequence in a low-level language.

Returning to block 335, if the example instruction support determiner determines that the emulation sequence requires compilation (e.g., block 335 returns a result of YES), the example instruction support determiner 120 determines whether the emulation sequence can be compiled into a GPU instructions. (Block 340). In examples disclosed herein, the instruction support determiner 120 determines whether the emulation sequence can be compiled into GPU instructions by attempting the compilation using the example compiler 135, and reviewing any errors produced by the compiler 135.

If the example instruction support determiner 120 determines that the emulation sequence can be compiled into GPU instructions for execution by the GPU 160 (e.g. block 340 returns a result of YES), an appended emulation approach 344 is used. In the example appended emulation approach 344, the example instruction modifier 130 replaces the instruction with initialization instructions, a first jump instruction, and cleanup instructions. (Block 345). The initialization instructions, the first jump instruction, and the cleanup instructions represent a pattern which first saves required registers and prepares input parameters for execution of the emulation sequence (e.g., the initialization instructions), transfers control to the emulation sequence for execution (e.g., the first jump instruction), and upon a return of control, performs any cleanup operations to enable execution of the remainder of the instrumented GPU kernel 159 (e.g., the cleanup instructions). The example compiler 135 compiles the emulation sequence into low-level instructions for execution by the GPU 160. (Block 350). The example instruction modifier 130 then appends the compiled emulation sequence and a second jump function to the end of the instrumented GPU kernel 159. (Block 355). The second jump function, when executed by the GPU 160, causes control to return to the cleanup instructions inserted in connection with block 345. Control then proceeds to block 330, where the example kernel accessor 115 determines whether any additional instructions exist for review.

Returning to block 340, if the example instruction support determiner 120 determines that the emulation sequence cannot be compiled into GPU instructions (e.g., block 340 returns a result of NO), the example instruction modifier 130 uses the offloaded emulation approach 364. Thus, the offloaded emulation approach 364 is utilized when, for example, emulation of the new instruction cannot be completed by instructions executed by the GPU alone. For example, if the instructions were to operate some new hardware component of a next-generation GPU that does not exist in the GPU 160, emulation of the operation of the new hardware component may be offloaded to the instrumentation engine 110 for execution.

To implement the example offloaded emulation approach 364, the example instruction modifier 130 replaces the instruction with an emulation offloading instruction(s). (Block 365). In some examples, the emulation offloading instruction(s) include an emulation sequence identifier of the execution sequence to be offloaded, which is provided back to the instrumentation engine 110 by the GPU 160 when executing the emulation offloading instruction(s). The emulation offloading instruction(s), when executed, cause the GPU 160 to perform operations described in further detail in connection with FIGS. 7 and/or 8, below. In short, the GPU 160, when executing the emulation offloading instruction(s), requests offloaded emulation of an instruction by the instrumentation engine 110 via the shared memory 190, waits for an indication from the instrumentation engine 110 that the emulation is complete, and retrieves the resulting data from the shared memory 190.

The example instruction modifier 130 prepares the emulation sequence to be offloaded for later execution by the instruction offloading executor 185. (Block 368). In the illustrated example of FIG. 3, the instruction modifier prepares the emulation sequence by storing the corresponding instructions of the emulation sequence in the offloaded instruction data store 187. In some examples, the instruction modifier 130 interfaces with the compiler 135 to create compiled instructions that are to be executed by the instruction offloading executor 185 (e.g., to perform the emulation sequence). In examples disclosed herein, the instruction modifier stores the emulation sequence identifier in connection with the emulation sequence instructions to facilitate later identification of the emulation sequence to be executed.

Control then proceeds to block 330, where the example kernel accessor 115 determines whether any additional instructions exist for review.

In the illustrated example of FIG. 3, the example instrumentation engine 110 selects between the in-line emulation approach 337, the appended emulation approach 344, and the offloaded emulation approach 364 based on whether the emulation sequence requires compilation and/or whether the emulation sequence can be compiled into GPU instructions. However, any other approach to selecting between the in-line emulation approach 337, the appended emulation approach 344, and the offloaded emulation 364 approach may additionally or alternatively be used. For example, a developer may provide, as part of the instruction information 102, instructions to the instrumentation engine 110 identifying which approach is to be used.

Figure 4:
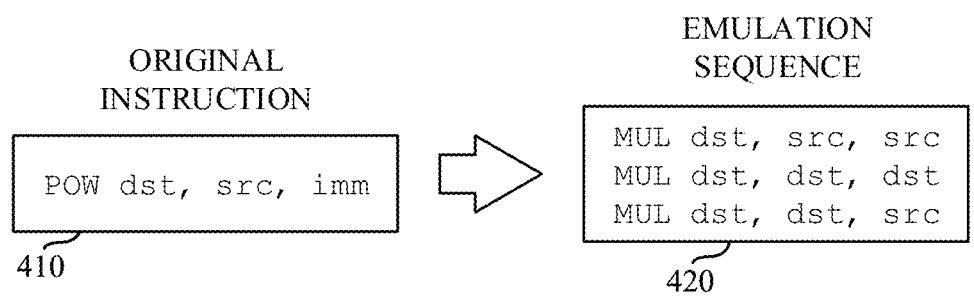
FIG. 4 is a diagram representing an original, unsupported, instruction and an emulation sequence used to emulate the original instruction.

FIG. 4 is a diagram representing an original, unsupported, instruction and an emulation sequence used to emulate the original instruction. The example diagram of FIG. 4 includes an original instruction 410, and an emulation sequence 420 that can be used to emulate the original instruction 410. In some examples, the emulation sequence is referred to as a capsule. In examples disclosed herein, the emulation sequence is provided as a part of the instruction information 102. In the example of FIG. 4, the emulation sequence 420 is provided in a low-level language (e.g., assembly language, machine language, etc.). However, in some examples, the emulation sequence may be provided in a high-level language (e.g., C), and may be compiled by the compiler 135.

In practice, the original instruction 410 might not be supported by the GPU 160, but may instead be intended to be supported by a future GPU. In the illustrated example of FIG. 4, the original instruction is a power instruction. The opcode POW identifies the power instruction, while the parameters dst, src, and imm represent a destination address, a source address, and a power value, respectively. The function to be performed by the GPU 160 is represented by Equation 1, below:

$$dst = src^{imm} \qquad \text{Equation 1}$$

However, any other function may additionally or alternatively be used. In the illustrated example of FIG. 4, the original instruction 410 is replaced by an emulation sequence 420 that corresponds to a scenario where the power value is five. Of course, any other emulation sequence may be used corresponding to the parameters of the original instruction. Thus, the power function is implemented by a series of multiplication instructions to achieve a same expected result as the original instruction 410.

Figure 5:
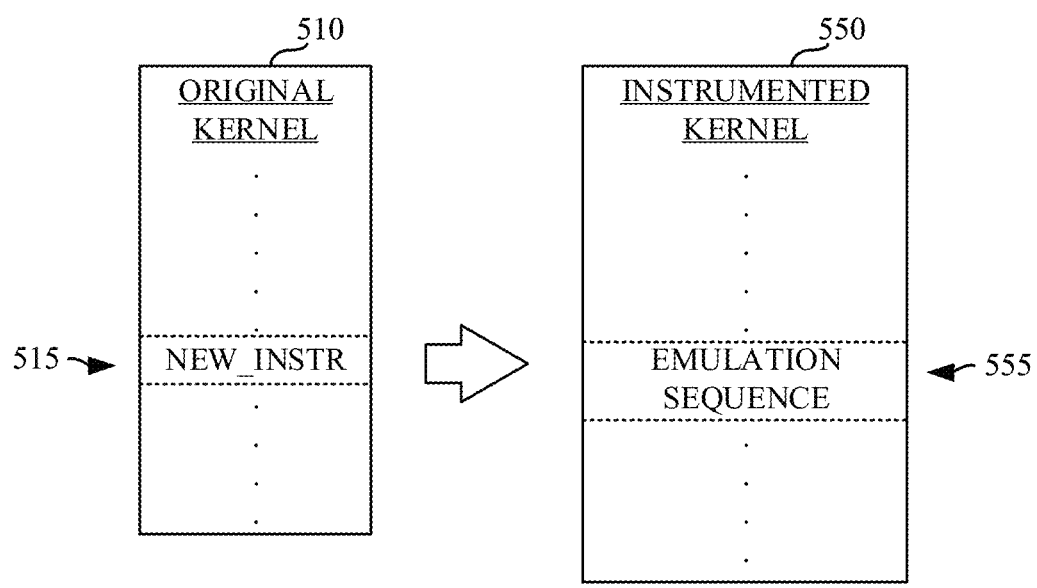
FIG. 5 is a diagram illustrating replacement of an instruction with an emulation sequence.

FIG. 5 is a diagram illustrating replacement of an instruction 515 with an emulation sequence 555. The example diagram of FIG. 5 includes an original kernel 510 having a new instruction 515, and an instrumented kernel 650 having an emulation sequence 555. In the illustrated example of FIG. 5, the instrumentation engine 110, having identified an emulation sequence corresponding to an unsupported instruction (e.g., in connection with blocks 320 and/or 335 of FIG. 3), replaces the instruction 515 in the original kernel 510 with the emulation sequence 555 to produce the instrumented kernel 550. In the illustrated example of FIG. 5, the emulation sequence 555 is inserted in-line with respect to the original kernel 510.

Figure 6:
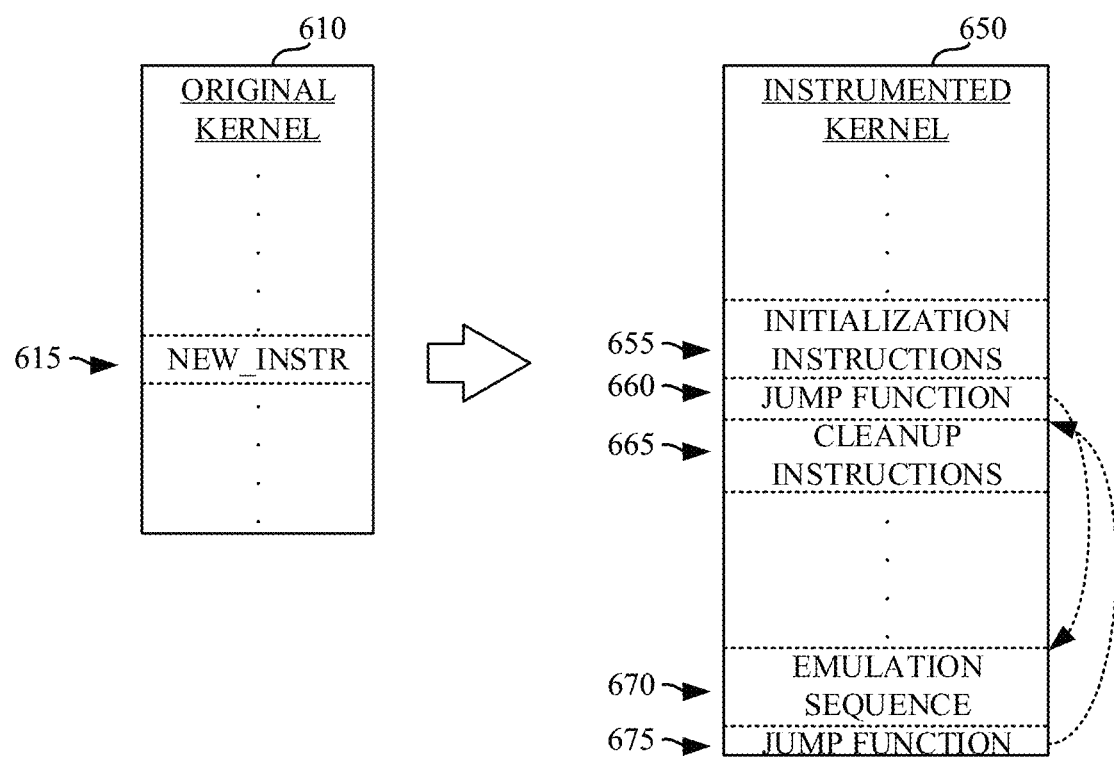
FIG. 6 is a diagram illustrating replacement of an instruction with a jump instruction for use of an appended emulation sequence.

FIG. 6 is a diagram illustrating replacement of an instruction with a jump instruction for use of an appended emulation sequence. The example diagram of FIG. 6 includes an original kernel 610 having a new instruction 615, and an instrumented kernel 650. The example instrumented kernel 650 includes initialization instructions 655, a first jump function 660, cleanup instructions 665, an emulation sequence 670, and a second jump function 675. In contrast to the illustrated example of FIG. 5, the emulation sequence 670 of FIG. 6 is appended to the original kernel 610.

The example initialization instructions 655, the first jump function 660, and the cleanup instructions 665 represent a pattern which first saves required registers and prepares input parameters for execution of the emulation sequence 670, and then transfers the control to the emulation sequence 670. In the illustrated example of FIG. 6, the emulation sequence 670 is included as part of the instrumented kernel 650. The emulation sequence 670 emulates the functional behavior of the new instruction 615. Upon completion of the execution of the emulation sequence 670, control is passed back to the point just after transferring to the emulation sequence (e.g., the second jump function 675 causes control to return to the cleanup instructions 665). The example cleanup instructions 665 restore the necessary registers and commits the new state (loads destination register, copies the data to memory, etc.). The example approach of FIG. 6 results in an instrumented kernel that is more resource intensive than the in-line emulation approach of FIG. 5, but still is close to the real hardware performance levels.

FIG. 7 is a communications diagram 700 representing operations to be performed by the example instrumentation engine 110 and the example GPU 160 of FIG. 1. As noted above, in some examples, the emulation routines for the new instructions are implemented in "C" code, and execution thereof is offloaded to the instrumentation engine 110. The example communications diagram 700 of FIG. 7 represents run-time operations performed by the GPU 160 to request offloading of an emulation sequence, and run-time operations performed by the instrumentation engine 110 to execute the emulation sequence and provide resultant data to the GPU 160.

The example process of FIG. 7 begins when the GPU reaches an emulation offloading instruction in the instrumented GPU kernel (e.g., an emulation offloading instruction inserted in connection with block 365 of FIG. 3). The example GPU 160 prepares an emulation request within the shared memory 190. (Block 705). In particular, the emulation request is stored at the request data address 192 of the shared memory 190, and identifies the emulation sequence to be performed by the instrumentation engine 110 (e.g., using an emulation sequence identifier). The example GPU 160 writes source data (e.g., input data to the emulation sequence) to the source data address 193 of the shared memory 190. (Block 710). The example GPU 160 then sets the emulation request flag 191 of the shared memory 190 to indicate the presence of an emulation request to the instrumentation engine 110. (Block 720).

The instrumentation engine 110 monitors the emulation request flag 191 of the shared memory 190 to detect when the GPU 160 indicates that an emulation request is present. In examples disclosed herein, a single shared memory 190 and/or emulation request flag 191 is shown. However, in practice, multiple emulation request flags corresponding to each hardware thread executed by the GPU 160 may be monitored. The example instruction offloading communicator 180 identifies the emulation instructions to be executed. (Block 730). In examples disclosed herein, the example instruction offloading communicator 180 detects an emulation sequence identifier within the emulation request (e.g., stored at the request data address 192 of the shared memory 190), and performs a lookup in the offloaded instruction data store 187 to retrieve the instructions for execution. However, any other approach to identifying the instructions may additionally or alternatively be used. For example, separate shared memory locations may be used for different emulation sequences, the emulation sequence (e.g., the source code or a compiled version thereof) may be provided as part of the offloading request.

The example instruction offloading communicator 180 accesses source data from the source data address 193 of the shared memory 190, and provides the source data to the instruction offloading executor 185 for execution. (Block 735). The example instruction offloading executor 185 executes the identified emulation instructions using the source data. (Block 740). The example instruction offloading communicator 180 writes the resulting data at the resulting data address 194 of the shared memory 190. (Block 745). The example instruction offloading communicator 180 indicates to the GPU 160 that the execution of the offloaded instructions is complete. (Block 750). In examples disclosed herein, the indication that the execution of the offloaded instructions is complete is provided by setting a flag in the shared memory 190. However, in some examples, the indication may be provided by clearing the emulation request flag 191, which was previously set by the GPU 160 (e.g., to indicate the presence of the offloading request).

Control then returns to the GPU 160 which, upon detecting the indication that the execution of the offloaded instructions is complete, accesses the resulting data at the resulting data address 194 of the shared memory 190. (Block 760). The example GPU 160 then proceeds to execute the remainder of the instrumented GPU kernel 159. In some examples, the example process of FIG. 7 may be executed again upon, for example, reaching a second emulation offloading instruction inserted in connection with block 365 of FIG. 3.

Figure 8:
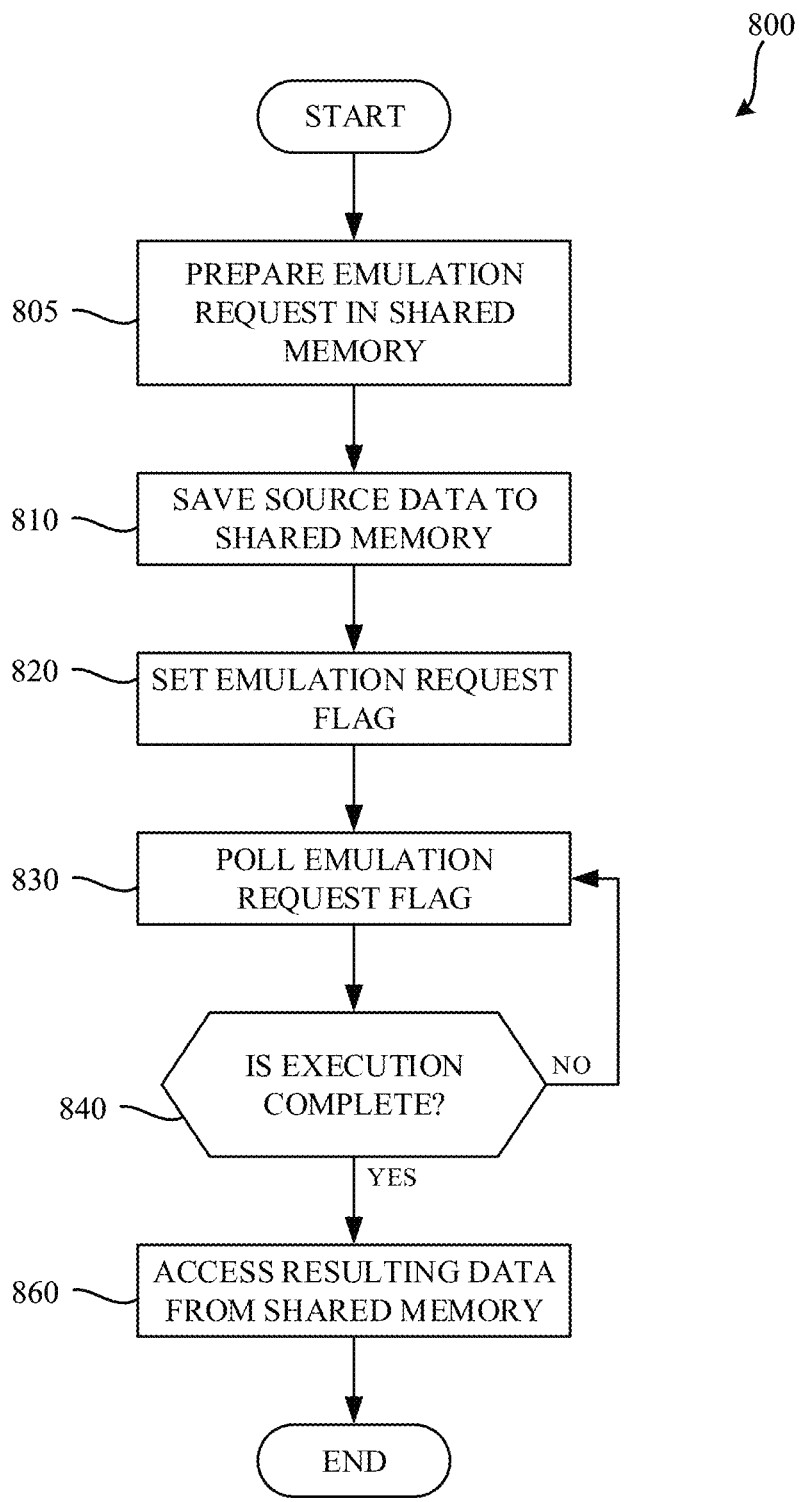
FIG. 8 is a flowchart representative of machine readable instructions that, when executed, cause the GPU of FIG. 1 to request offloaded emulation of an instruction.

FIG. 8 is a flowchart representative of machine readable instructions 800 that, when executed, cause the GPU 160 of FIG. 1 to request offloaded emulation of an instruction. The example process 800 of FIG. 8 begins when the GPU 160 reaches an emulation offloading instruction in the instrumented GPU kernel 159 (e.g., an emulation offloading instruction inserted in connection with block 365 of FIG. 3). In some examples, rather than reaching an emulation offloading instruction in the instrumented GPU kernel 150, the example process 800 of FIG. 8 may be triggered by the GPU 160 upon reaching an instruction that is not supported by the GPU 160. Thus, the GPU 160 may, on its own, determine whether execution of an instruction should be offloaded to a CPU (e.g., based on whether the instruction is supported by the GPU 160).

To begin the example process 800 of FIG. 8, the example GPU 160 prepares an emulation request within the shared memory 190. (Block 805). In particular, the emulation request is stored at the request data address 192 of the shared memory 190, and identifies the emulation sequence to be performed by the instrumentation engine 110 (e.g., using an emulation sequence identifier). The example GPU 160 writes source data (e.g., input data to the emulation sequence) to the source data address 193 of the shared memory 190. (Block 810). The example GPU 160 then sets the emulation request flag 191 of the shared memory 190 to indicate the presence of an emulation request to the instrumentation engine 110. (Block 820).

At this point, execution of the emulation request is performed by the instrumentation engine 110. As performance of the requested emulation may take some time, the GPU 160 periodically and/or a-periodically polls the emulation request flag 191. (Block 830). In examples disclosed herein, the example instrumentation engine 110 clears the emulation request flag 191 when the execution of the offloaded emulation request is complete. Thus, the polling the emulation request flag 191 enables the GPU to determine whether execution of the offloaded emulation request is complete. (Block 840). However, any other approach to monitoring for completion of the execution of the emulation request may additionally or alternatively be used. If the example GPU 160 determines that execution of the offloaded emulation request is not complete (e.g., block 840 returns a result of NO), the example GPU 160 re-polls the emulation request flag. (Block 830). If the example GPU 160 determines that execution of the offloaded emulation request is complete (e.g., block 840 returns a result of YES), the example GPU 160 accesses the resulting data at the resulting data address 194 of the shared memory 190. (Block 860). The example GPU 160 then proceeds to execute the remainder of the instrumented GPU kernel 159. In some examples, the example process of FIG. 8 may be executed again upon, for example, reaching a subsequent emulation offloading instruction inserted in connection with block 365 of FIG. 3.

Figure 9:
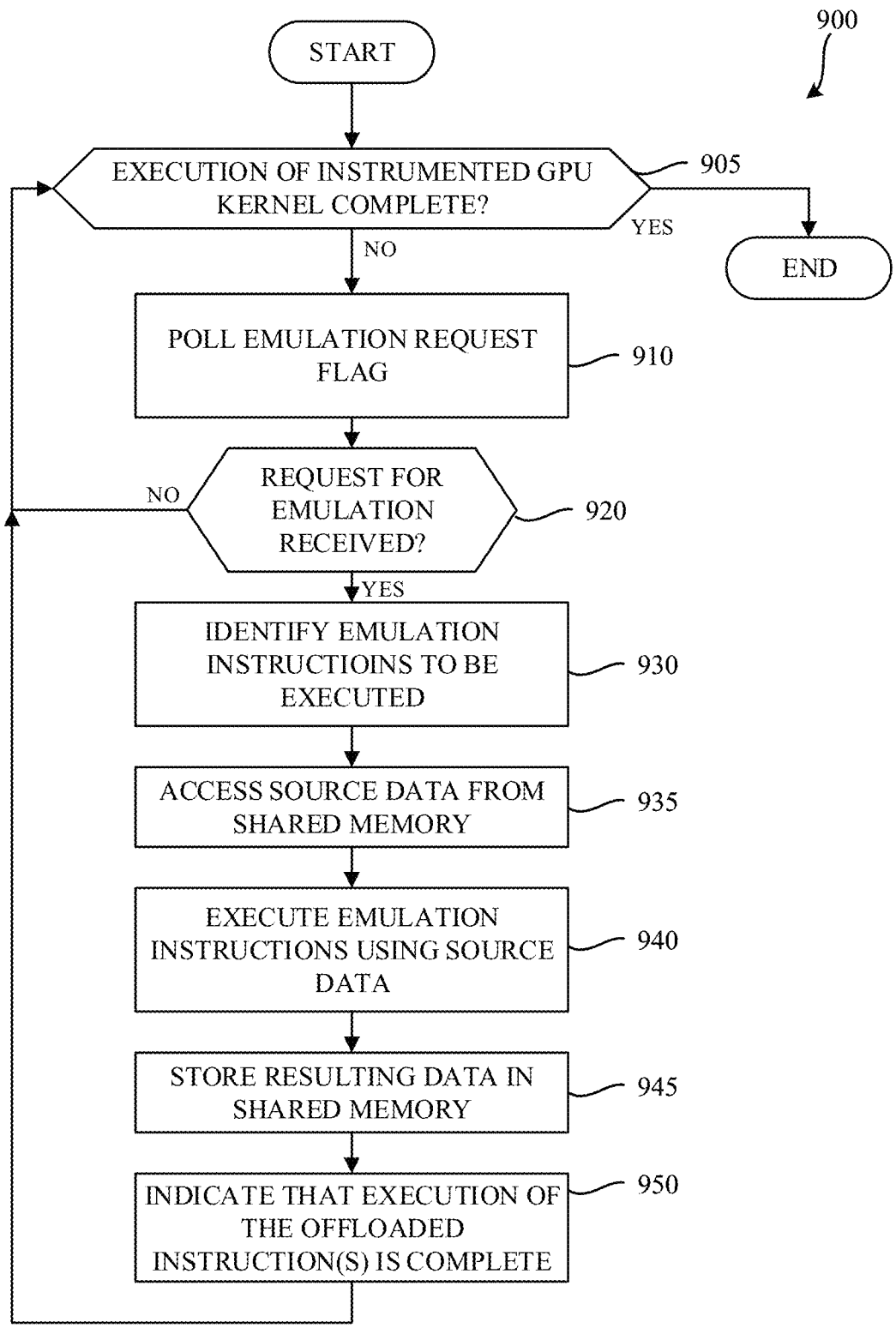
FIG. 9 is a flowchart representative of machine readable instructions that, when executed, cause the instrumentation engine of FIG. 1 to perform offloaded emulation of an instruction.

FIG. 9 is a flowchart representative of machine readable instructions 900 that, when executed, cause the instrumentation engine of FIG. 1 to perform offloaded emulation of an instruction. The example process 900 of the illustrated example of FIG. 9 begins when the instruction provider 145 instructs the GPU 160 to initiate execution of the instrumented GPU kernel 159. The example instruction provider 145 then monitors the GPU 160 via the GPU interface 148 to determine if execution of the instrumented GPU kernel 159 is complete. (Block 905). If the execution of the GPU kernel 159 is not complete (e.g., block 905 returns a result of NO), the example instruction offloading communicator 180 polls the emulation request flag 191 of the shared memory 190 to detect whether the GPU 160 has requested emulation offloading. (Block 910). In examples disclosed herein, a single shared memory 190 and/or emulation request flag 191 is used. However, in practice, multiple emulation request flags corresponding to each hardware thread executed by the GPU 160 may be monitored. The example instruction offloading communicator 180 determines whether a request for emulation offloading has been received. (Block 920). If no request has been received (e.g., block 920 returns a result of NO), control returns to block 905 where the example instruction provider 145 monitors the GPU 160 to determine if execution of the instrumented GPU kernel 159 is complete. (Block 905).

If a request has been received (e.g., block 920 returns a result of YES), the example instruction offloading communicator 180 identifies the emulation instructions to be executed. (Block 930). In examples disclosed herein, the example instruction offloading communicator 180 detects an emulation sequence identifier within the emulation request (e.g., stored at the request data address 192 of the shared memory 190), and performs a lookup in the offloaded instruction data store 187 to retrieve the instructions for execution. However, any other approach to identifying the instructions may additionally or alternatively be used. For example, separate shared memory locations may be used for different emulation sequences, the emulation sequence (e.g., the source code or a compiled version thereof) may be provided as part of the offloading request.

The example instruction offloading communicator 180 accesses source data from the source data address 193 of the shared memory 190, and provides the source data to the instruction offloading executor 185 for execution. (Block 935). The example instruction offloading executor 185 executes the identified emulation instructions using the source data. (Block 940). The example instruction offloading communicator 180 writes the resulting data at the resulting data address 194 of the shared memory 190. (Block 945). The example instruction offloading communicator 180 indicates to the GPU 160 that the execution of the offloaded instructions is complete. (Block 950). In examples disclosed herein, the indication that the execution of the offloaded instructions is complete is provided by setting an execution completion flag in the shared memory 190. However, in some examples, the indication may be provided by clearing the emulation request flag 191, which was previously set by the GPU 160 (e.g., to indicate the presence of the offloading request). Control then returns to block 905, where the instruction provider 145 monitors the GPU 160 via the GPU interface 148 to determine if execution of the instrumented GPU kernel 159 is complete. (Block 905). The example process 900 of FIG. 9 then continues until the example instruction provider determines that execution of the instrumented GPU kernel 159 is complete (e.g., until block 905 returns a result of NO).

Figure 10:
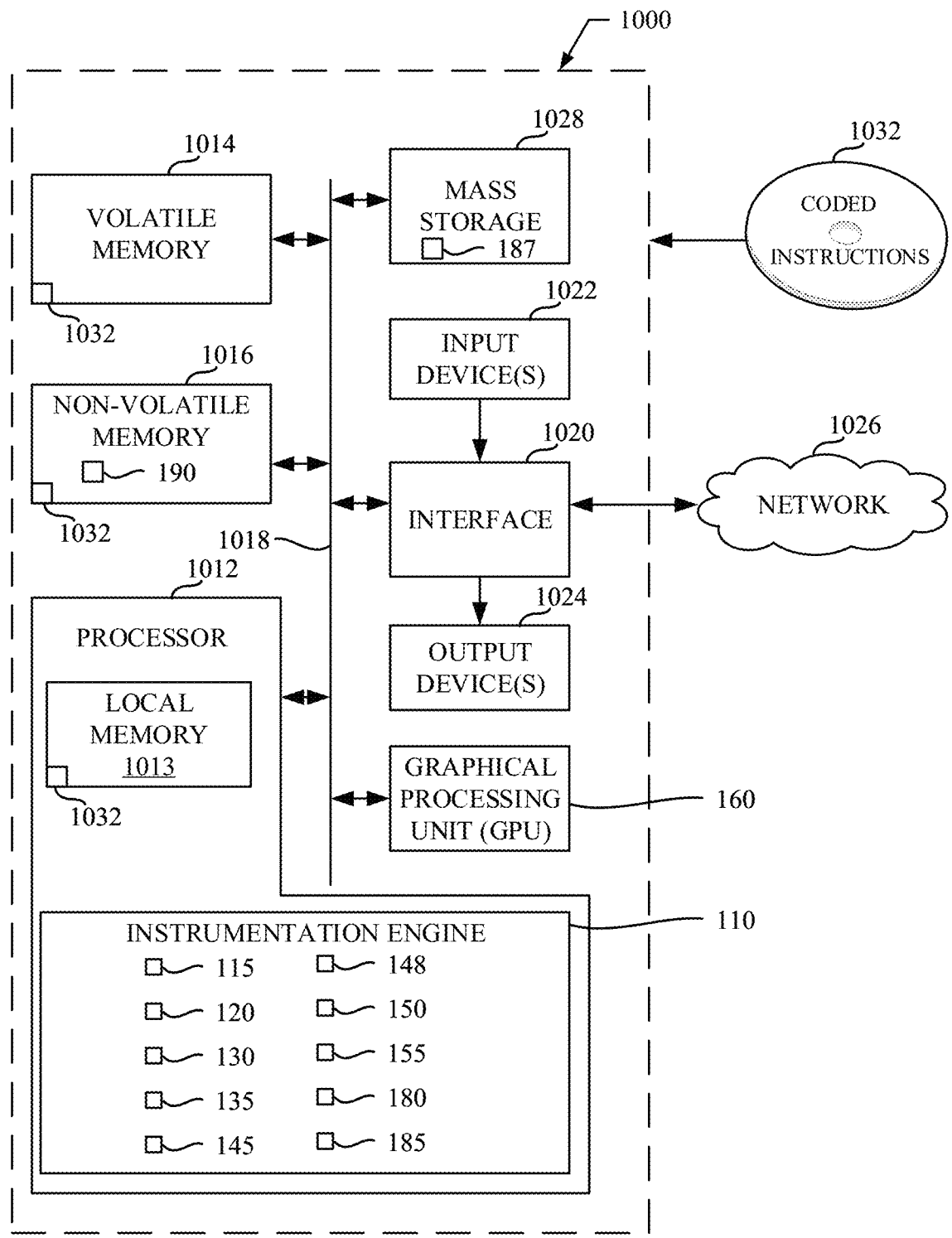
FIG. 10 is a block diagram of an example processing platform structured to execute the instructions of FIGS. 3, 4, and/or 6 to implement the example profiler of FIG. 2.

FIG. 10 is a block diagram of an example processor platform 1000 structured to execute the instructions of FIGS. 2, 3, 7, and/or 9 to implement the example instrumentation engine 110 of FIG. 1. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example kernel accessor 115, the example instruction support determiner 120, the example instruction modifier 130, the example compiler 135, the example instruction provider 145, the example GPU interface 148, the example statistic collector 150, the example statistic reporter 155, the example instruction offloading communicator 180, and the example instruction offloading executor 185.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller. In the illustrated example of FIG. 10, the example volatile memory 1014 implements the example shared memory 190.

The processor platform 1000 of the illustrated example includes a graphics processing unit (GPU) in communication via the bus 1018.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives. The example mass storage device 1028 implements the example offloaded instruction data store 187.

The machine executable instructions 1032 of FIGS. 2, 3, 7, 8, and/or 9 may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus and articles of manufacture have been disclosed that enable emulation of GPU instructions. The disclosed methods, apparatus and articles of manufacture improve the efficiency of using a computing device by enabling unsupported GPU instructions, such as those instructions intended to be supported in future generations of GPUs, to be emulated on existing hardware GPUs. Using such a hardware-based emulation approach enables improved performance when attempting to execute GPU instructions. The disclosed methods, apparatus and articles of manufacture are accordingly directed to one or more improvement(s) in the functioning of a computer.

Example 1 includes an apparatus to create instrumented graphics processing unit (GPU) kernels, the apparatus comprising a kernel accessor to access an instruction of an original GPU kernel, the original GPU kernel intended to be executed at a first GPU, an instruction support determiner to determine whether execution of the instruction is supported by a second GPU different from the first GPU, an instruction modifier to, in response to determining that the execution of the instruction is not supported by the second GPU, create an instrumented GPU kernel based on the original GPU kernel, the instrumented GPU kernel including an emulation sequence, the emulation sequence to, when executed by the second GPU, cause the second GPU to emulate execution of the instruction by the first GPU.

Example 2 includes the apparatus of example 1, wherein the creating of the GPU kernel includes performing an in-line replacement of the instruction of the original GPU kernel with the emulation sequence.

Example 3 includes the apparatus of example 1, wherein the instruction modifier is to replace the instruction with a first jump instruction, and append the emulation sequence and a second jump instruction to the instrumented GPU kernel.

Example 4 includes the apparatus of example 3, wherein the first jump instruction is to, when executed by the second GPU, cause the second GPU to execute the emulation sequence, and the second jump instruction is to, when executed by the second GPU, cause the second GPU to execute an emulation cleanup instruction.

Example 5 includes the apparatus of example 1, further including a compiler to compile a high-level instruction to create the emulation sequence.

Example 6 includes the apparatus of example 1, further including an instruction offloading communicator to monitor a shared memory for an emulation offloading request from the second GPU, and an instruction offloading executor to, in response to detection of the emulation offloading request, emulate execution of the instruction by the first GPU, the instruction offloading communicator is further to provide a result of the emulation to the second GPU via the shared memory.

Example 7 includes at least one non-transitory computer readable medium comprising instructions that, when executed, cause at least one processor to at least access an instruction of an original GPU kernel, the original GPU kernel intended to be executed at a first GPU, determine whether execution of the instruction is supported by a second GPU different from the first GPU, in response to a determination that the execution of the instruction is not supported by the second GPU, create an instrumented GPU kernel based on the original GPU kernel, the instrumented GPU kernel including an emulation sequence, the emulation sequence to, when executed by the second GPU, cause the second GPU to emulate execution of the instruction by the first GPU.

Example 8 includes the at least one non-transitory computer readable medium of example 7, wherein the instructions, when executed, cause the at least one processor to create the GPU kernel by performing an in-line replacement of the instruction of the original GPU kernel with the emulation sequence.

Example 9 includes the at least one non-transitory computer readable medium of example 7, wherein the instructions, when executed, cause the at least one processor to replace the instruction of the original GPU kernel with a first jump instruction, and append the emulation sequence and a second jump instruction to the instrumented GPU kernel.

Example 10 includes the at least one non-transitory computer readable medium of example 9, wherein the first jump instruction is to, when executed by the second GPU, cause the second GPU to execute the emulation sequence, and the second jump instruction is to, when executed by the second GPU, cause the second GPU to execute an emulation cleanup instruction.

Example 11 includes the at least one non-transitory computer readable medium of example 7, wherein the instructions, when executed, cause the at least one processor to compile a high-level instruction to create the emulation sequence.

Example 12 includes the at least one non-transitory computer readable medium of example 7, wherein the instructions, when executed, cause the at least one processor to monitor a shared memory for an emulation offloading request from the second GPU, in response to detection of the emulation offloading request, emulate, by executing an instruction with the processor, execution of the instruction by the first GPU, and provide a result of the emulation to the second GPU via the shared memory.

Example 13 includes an apparatus to create instrumented graphics processing unit (GPU) kernels, the apparatus comprising means for accessing an instruction of an original GPU kernel, the original GPU kernel intended to be executed at a first GPU, means for determining whether execution of the instruction is supported by a second GPU different from the first GPU, means for modifying to, in response to a determination that the execution of the instruction is not supported by the second GPU, create an instrumented GPU kernel based on the original GPU kernel, the instrumented GPU kernel including an emulation sequence, the emulation sequence to, when executed by the second GPU, cause the second GPU to emulate execution of the instruction by the first GPU.

Example 14 includes the apparatus of example 13, wherein the means for modifying is to perform an in-line replacement of the instruction of the original GPU kernel with the emulation sequence.

Example 15 includes the apparatus of example 13, wherein the means for modifying is to replace the instruction with a first jump instruction, the means for modifying to append the emulation sequence and a second jump instruction to the instrumented GPU kernel.

Example 16 includes the apparatus of example 15, wherein the first jump instruction is to, when executed by the second GPU, cause the second GPU to execute the emulation sequence, and the second jump instruction is to, when executed by the second GPU, cause the second GPU to execute an emulation cleanup instruction.

Example 17 includes the apparatus of example 13, further including means for compiling a high-level instruction to create the emulation sequence.

Example 18 includes the apparatus of example 1, further including means for monitoring a shared memory for an emulation offloading request from the second GPU, and means for emulating, in response to detection of the emulation offloading request, execution of the instruction by the first GPU, the means for monitoring to provide a result of the emulation to the second GPU via the shared memory.

Example 19 includes a method for creating instrumented graphics processing unit (GPU) kernels, the method comprising accessing an instruction of an original GPU kernel, the original GPU kernel intended to be executed at a first GPU, determining, by executing an instruction with a processor, whether execution of the instruction is supported by a second GPU different from the first GPU, in response to determining that the execution of the instruction is not supported by the second GPU, creating an instrumented GPU kernel based on the original GPU kernel, the instrumented GPU kernel including an emulation sequence, the emulation sequence to, when executed by the second GPU, cause the second GPU to emulate execution of the instruction by the first GPU.

Example 20 includes the method of example 19, wherein the creating of the GPU kernel includes performing an in-line replacement of the instruction of the original GPU kernel with the emulation sequence.

Example 21 includes the method of example 19, wherein the creating of the instrumented GPU kernel includes replacing the instruction of the original GPU kernel with a first jump instruction, and appending the emulation sequence and a second jump instruction to the instrumented GPU kernel.

Example 22 includes the method of example 21, wherein the first jump instruction is to, when executed by the second GPU, cause the second GPU to execute the emulation sequence, and the second jump instruction is to, when executed by the second GPU, cause the second GPU to execute an emulation cleanup instruction.

Example 23 includes the method of example 19, further including compiling a high-level instruction to create the emulation sequence.

Example 24 includes the method of example 19, further including monitoring a shared memory for an emulation offloading request from the second GPU, in response to detection of the emulation offloading request, emulating, by executing an instruction with the processor, execution of the instruction by the first GPU, and providing a result of the emulation to the second GPU via the shared memory.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. At least one non-transitory computer readable medium comprising instructions, when executed, cause a first logic circuit to at least:
    execute an instrumented kernel, the instrumented kernel including an emulation sequence for execution by the first logic circuit, the instrumented kernel generated based on an original kernel created for execution at a second logic circuit different from the first logic circuit;
    save, in response to determination that the emulation sequence is to be executed, source data to a shared memory;
    set an emulation request flag to indicate, to processor circuitry separate from the first logic circuit, that offloaded execution of the emulation sequence is to be executed;
    monitor the emulation request flag to determine whether the offloaded execution of the emulation sequence is complete; and
    access resulting data from the shared memory.

2. The at least one non-transitory computer readable medium of claim 1, wherein the instructions, when executed, further cause the first logic circuit to prepare an emulation request, the emulation request to identify the emulation sequence to be offloaded.

3. The at least one non-transitory computer readable medium of claim 1, wherein the first logic circuit does not support execution of the original kernel.

4. The at least one non-transitory computer readable medium of claim 1, wherein the emulation sequence corresponds to at least one instruction of the original kernel for which the first logic circuit does not support execution.

5. The at least one non-transitory computer readable medium of claim 1, wherein the instructions, when executed, further cause the first logic circuit to continue execution of the instrumented kernel based on the resulting data.

6. The at least one non-transitory computer readable medium of claim 1, wherein the first logic circuit is a graphics processing unit (GPU).

7. An apparatus comprising:
an interface;
instructions in the apparatus;
a first logic circuit to execute the instructions to cause the first logic circuit to:
execute an instrumented kernel, the instrumented kernel including an emulation sequence for execution by the first logic circuit, the instrumented kernel generated based on an original kernel created for execution at a second logic circuit different from the first logic circuit;
save, in response to determination that the emulation sequence is to be executed, source data to a shared memory;
set an emulation request flag to indicate, to processor circuitry separate from the first logic circuit, that offloaded execution of the emulation sequence is to be executed;
monitor the emulation request flag to determine whether the offloaded execution of the emulation sequence is complete; and
access resulting data from the shared memory.

8. The apparatus of claim 7, wherein the instructions, when executed, further cause the first logic circuit to prepare an emulation request, the emulation request to identify the emulation sequence to be offloaded.

9. The apparatus of claim 7, wherein the first logic circuit does not support execution of the original kernel.

10. The apparatus of claim 7, wherein the emulation sequence corresponds to at least one instruction of the original kernel for which the first logic circuit does not support execution.

11. The apparatus of claim 7, wherein the first logic circuit is to continue execution of the instrumented kernel based on the resulting data.

12. The at least one non-transitory computer readable medium of claim 7, wherein the first logic circuit is a graphics processing unit (GPU).

13. A method comprising:
executing an instrumented kernel using a first logic circuit, the instrumented kernel including an emulation sequence for execution by the first logic circuit, the instrumented kernel generated based on an original kernel created for execution at a second logic circuit different from the first logic circuit;
saving, in response to determination that the emulation sequence is to be executed, source data to a shared memory;
setting an emulation request flag to indicate to processor circuitry separate from the first logic circuit that offloaded execution of the emulation sequence is to be executed;
monitoring the emulation request flag to determine whether the offloaded execution of the emulation sequence is complete; and
accessing resulting data from the shared memory.

14. The method of claim 13, further including preparing prepare an emulation request, the emulation request to identify the emulation sequence to be offloaded.

15. The method of claim 13, wherein the first logic circuit does not support execution of the original kernel.

16. The method of claim 13, wherein the emulation sequence corresponds to at least one instruction of the original kernel for which the first logic circuit does not support execution.

17. The method of claim 13, wherein the instructions, when executed, further cause the first logic circuit to continue execution of the instrumented kernel based on the resulting data.

18. An apparatus to create instrumented graphics processing unit (GPU) kernels, the apparatus comprising:
means for accessing an instruction of an original GPU kernel, the original GPU kernel intended to be executed at a first GPU; and
means for modifying to create an instrumented GPU kernel based on the original GPU kernel, the instrumented GPU kernel for execution by a second GPU different from the first GPU, the second GPU not supporting execution of the instruction of the original GPU kernel, the instrumented GPU kernel including an emulation sequence, the emulation sequence to, when executed by the second GPU, cause the second GPU to emulate execution of the instruction by the first GPU.

19. The apparatus of claim 18, wherein the means for modifying is to perform an in-line replacement of the instruction of the original GPU kernel with the emulation sequence.

20. The apparatus of claim 18, wherein the means for modifying is to replace the instruction with a first jump instruction, the means for modifying to append the emulation sequence and a second jump instruction to the instrumented GPU kernel.

21. The apparatus of claim 20, wherein the first jump instruction is to, when executed by the second GPU, cause the second GPU to execute the emulation sequence, and the second jump instruction is to, when executed by the second GPU, cause the second GPU to execute an emulation cleanup instruction.

22. The apparatus of claim 18, further including means for compiling a high-level instruction to create the emulation sequence.

23. The apparatus of claim 18, further including:
means for monitoring a shared memory for an emulation offloading request from the second GPU; and
means for emulating, in response to detection of the emulation offloading request, execution of the instruction by the first GPU, the means for monitoring to provide a result of the emulation to the second GPU via the shared memory.

* * * * *